United States Patent [19]

Drage

[11] 3,905,556

[45] Sept. 16, 1975

[54] METHOD AND APPARATUS FOR RECOVERY OF METALS FROM SCRAP

[75] Inventor: David J. Drage, Monee, Ill.

[73] Assignee: Air Products and Chemicals, Inc., Allentown, Pa.

[22] Filed: Aug. 14, 1974

[21] Appl. No.: 497,204

Related U.S. Application Data

[63] Continuation-in-part of Ser. No. 471,273, May 20, 1974.

[52] U.S. Cl. .......... 241/24; 241/79.1; 241/DIG. 38; 209/44
[51] Int. Cl.² ........................................ B02C 23/14
[58] Field of Search.............. 241/24, 79.1, DIG. 38; 209/44, 315, 467, 469, 472

[56] References Cited
UNITED STATES PATENTS

| | | | |
|---|---|---|---|
| 2,853,192 | 9/1958 | Berry .................................... | 209/469 |
| 2,942,792 | 6/1960 | Anderson et al. ............ | 241/DIG. 38 |
| 3,086,718 | 4/1963 | Lukas, Jr. .............................. | 241/24 |
| 3,444,996 | 5/1969 | Douglas et al. ........................ | 209/44 |
| 3,472,379 | 10/1969 | Lainas et al. ...................... | 209/44 X |

*Primary Examiner*—Granville Y. Custer, Jr.
*Attorney, Agent, or Firm*—James C. Simmons; Barry Moyerman

[57] ABSTRACT

Small pieces of scrap containing a mixture of metals obtained from previous fragmentation by crushing of the scrap in hammer mills or the like and from which at least a major portion of ferrous materials has been removed to provide such mixture rich in ductile metals, is subjected to further size reduction in a granulating chopper. The chopped product is classified by screening into several cuts of different size and each cut separately subjected to further dry separation into components differing in density to recover the individual metal components. In a preferred embodiment, prior to charging to the granulating chopper, the pieces of scrap from the last crushing operation preceding, are subject to air separation so as to remove selectively therefrom heavy particles, such as nuggets or the like, likely otherwise to damage the chopper blades. The light fraction from the air separation may optionally be subjected to magnetic separation to remove any remaining ferrous materials released by the crushing and/or air separation, from its encapsulation or occlusion in diamagnetic covering materials.

14 Claims, 1 Drawing Figure

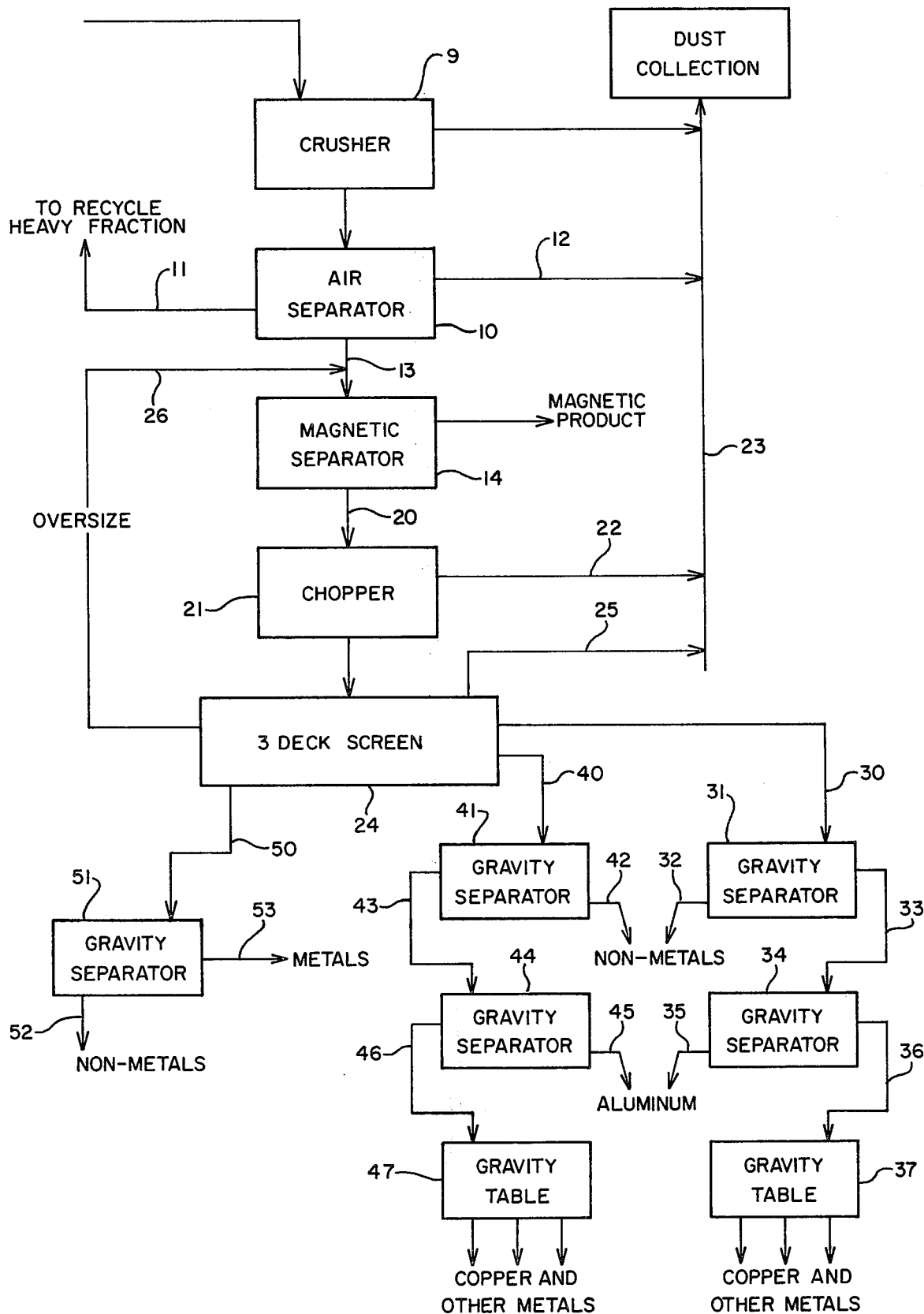

METHOD AND APPARATUS FOR RECOVERY OF METALS FROM SCRAP

REFERENCE TO RELATED APPLICATIONS

This application is a continuation-in-part of application Ser. No. 471,273, filed May 20, 1974.

BACKGROUND OF THE INVENTION

1. Field of the Invention

This invention relates to an apparatus and process for recovery from a scrap material containing a variety of mechanically associated metal components with or without associated non-metallic components, of the individual metal components or concentrates in useful degree of purity.

2. Description of the Prior Art

In light of the growing scarcity of primary raw materials, the recovery of metals from scrap material has become of increasing importance. Such recycling also helps prevent ecological trauma. However, much of the scrap available contains various metals and non-metals which are in such intimate mechanical association as to be not easily separable. For example, motor armatures comprise ferrous metals and nonferrous metals (e.g. copper and aluminum), insulation and the like. Yet recovery of the copper is difficult because of the way the armature is constructed.

Various methods employing cryogenic embrittlement have been proposed in scrap recovery such as those illustrated by the following United States patents: U.S. Pat. Nos. 2,879,005; 3,614,001; 3,666,185; 3,718,284 and 3,768,739 as well as the relevant references cited therein. Additionally, U.S. Pat. No. 3,605,243 shows a method for separating zinc and aluminum from a base metal scrap.

The cryogenic process is very effective for rendering certain types of scrap brittle (i.e., those whose fracture mode changes from ductile to brittle in a temperature range referred to as the 'transition temperature' range) and thus enabling it to be fragmented. However, problems are encountered where the scrap contains significant amounts of metals which remain ductile at cryogenic temperatures. As one example, the copper in a scrap material containing copper and ferrous metal does not experience brittle fracture following cryogenic cooling. Instead, it tends to become flattened, sheared, stretched or otherwise plastically deformed during the self-same crushing operation which shatters the ferrous material. As a consequence, substantial portions of ferrous material are not liberated and amenable to economic recovery. They are, instead, mechanically entrapped by nonferrous metal aggregates which encapsulate, entangle and make conventional sorting impossible.

In accordance with the disclosure in the aforesaid prior application, Ser. No. 471,273, effective separation of copper and other ductile metals from the ferrous components of scrap material is obtained by repeatedly crushing the scrap to progressively decreasing size particles, thus freeing the more brittle and magnetically-responsive materials such as iron products from their entanglement or encapsulation with the copper and other essentially diamagnetic materials and facilitating bulk separation of these. To facilitate the initial fragmentation of the scrap, it is embrittled by cooling to below the transition temperature. The product of reduced size from the last of a series of crushing stages is magnetically separated and the non-magnetic fraction, thus freed of ferrous components, is made available for recovery of separate individual metal components therefrom.

SUMMARY OF THE INVENTION

The present invention is principally concerned with the recovery of individual metal components from a comminuted mixed scrap from which the associated iron has been previously removed. It is further concerned, in a preferred embodiment, with treatment of the comminuted mixed scrap prior to the final stage of magnetic separation of iron components therefrom, so as to facilitate reduction of the essentially ductile metals remaining to the ultimate size ranges required for subsequent density separation of the remaining metal fraction into its individual components.

In accordance with the present invention a mixed scrap of reduced particle size from which associated ferrous materials have been previously removed at least to major extent by magnetic separation or otherwise, and comprising preponderately copper and or other ductile metals, is subjected to further granulation by shearing or chopping to a major dimension of up to about one-quarter inch. The thus chopped product is screened to provide at least two and preferably three or more separate cuts differing in particle size range. Each of these cuts is then separately subjected to further separation according to density into its individual metal components. In order to protect the shearing or chopping cutters against damage from relatively large particles, these are preferably removed prior to the chopping operation. These large particles include metal nuggets of brass, zinc, copper, aluminum or other metals, as well as crumpled strands and strips of interlaced wiry materials such as copper, originating from the presence in the original scrap of wound armatures and/o4 similar parts of other electrical apparatus. A composite mass of this sort poses problems in attempted screening since the wiry particles very quickly blind the screens. Accordingly, in the practice of a preferred embodiment of the present invention such composite is subjected to separation in an air classifier, the heavier particles including the metal nuggets and the like being recycled to additional reduction in size by impact and crushing in hammer mills or the like, while the lighter particles are passed on to magnetic separation for removal of ferrous components, prior to subjecting the residue of essentially ductile metals to the shearing or chopping cutters.

The operation of the invention will be fully understood and its several advantages appreciated from the detailed description which follows read in connection with the accompanying drawing.

DESCRIPTION OF THE DRAWING

The sole FIGURE is is a schematic flow diagram of a preferred embodiment of the process employed in accordance with the invention.

DETAILED DESCRIPTION OF THE INVENTION

While the invention is broadly applicable to metallic scrap material of widely varying composition, it will be described with specific reference to a selected scrap having a relatively high copper content. Other non-ferrous metals such as aluminum, zinc or precious metals may also be present. Typical of the scrap compositions that are advantageously treated in accordance with the invention, is the composite obtained by initial fragmentation of a mixture of discarded automobile generators, voltage regulators, electric motors, armatures, stators, scrap electrical wire, electronic devices, relays and the like having a relatively high copper content, an appreciable quantity of aluminum, organic insulating material, together with ferrous materials and usually small quantities of other metals. The composite mass subjected to treatment in accordance with the present invention is one resulting from previous processing of the original scrap by the method described in my previous application Serial No. 471,273 or by any other method resulting in the production of a composite of metals rich in copper and containing iron and other metals, the pieces in such composite being of suitable size for feeding to conventional choppers as hereinafter described.

In accordance with the procedure described in the aforesaid prior patent application, the original feed stock of scrap is initially subjected to cryogenic cooling to effect embrittlement of ferrous and organic components following which it is broken up by impact and crushing into pieces, which may be in the order of about up to 3 inches in smallest dimension. The scrap, after such first size reduction, is separated into light and heavy fractions and the heavy fraction is separated into magnetic and non-magnetic portions, the latter portion being combined with the light fraction from the first aforesaid separation and the combined stream subjected to a second crushing operation by impact and crushing, whereby the scrap is now reduced to about 2 inches size in smallest dimension. After the second size reduction step, the thus comminuted scrap is subjected to a second air separation with the stream of heavier particles being subjected to magnetic separation and the resulting nonmagnetic fraction being recycled to the second crushing mill. The light fraction from the air separation step is further reduced in size to particles of about one inch in smallest dimension and the entire product of such milling subjected to one or more magnetic separation steps to remove magnetic components therefrom. The residual non-magnetic portion may at this point be sent to further processing for recovery of the individual metal components or it may be subjected to one or more additional steps of size reduction by impact and/or crushing followed by magnetic separation of the milled product, the ultimate nonmagnetic fraction from the last milling operation being sent to further treatment for recovery of the individual metal components.

Referring now to the accompanying drawings, the material in line 20 being fed to the granulator or wire chopper 21, is composed of small pieces of scrap resulting from previous successive comminution in hammer mills or the like, and comprising a mixture of metals rich in copper. While the particular size of the pieces is largely optional, convenient size pieces for feeding to commercially available choppers may be of about one-half inch in cross section and up to about 1 inch lengths, the size being determined by the grate openings in the last preceding hammer mill. This fraction being composed chiefly of ductile metals mixed with some non-metallic substances is not readily susceptible to comminution to controlled uniform size range by milling operations such as crushing or impacting as in the case of brittle or embrittled materials. Accordingly, to obtain further reduction to uniform size range in order to facilitate separation and recovery of the individual metal components therein, the composite stream of metal pieces in line 20 is fed to the wire chopper or granulating mill 21 of the type employing chopping or shearing action. A commercially available mill of this kind that may be employed is that known in the industry as a Sutton-Steele radial knife granulator (described in Triple/S Dynamics Co. Product Bulletin "Sutton-Steele Wire Granulators" or similar machines such as Cumberland Series C Plastics Granulating Machine, described in Cumberland Engineering Co., Bulletin 73-G). In this granulating mill 21, the pieces are reduced to predominantly about one-quarter inch size and smaller or about five-sixteenths inch size and smaller depending upon subsequent separation operations to be employed. Dust is removed overhead from the mill and transported, as indicated at 22, to a dust collection duct 23 leading to a collection system. The dust which is collected in cyclones, bag filters or the like, may be subject to recovery of metallic and non-metallic components contained therein. By "dust" is meant those fines which are the natural result of any comminuting operation and may include metallic fines of to about 100 mesh and organic materials which may be of larger size.

The comminuted product from granulator 21 is discharged to a screening operation for classification into three or more cuts of different particle size ranges, the particle size in each such fraction essentially lying within a narrow range. In the embodiment illustrated, a conventional three deck screen is employed at 24, in which instance four distinct size graded fractions will be obtained. While not limited to the precise ranges, by way of example a suitable size distribution for the four fractions could be:

1. largest size, above one-quarter inch,
2. first middle fraction, one-quarter to one-eighth inch,
3. second middle fraction, one-eighth to one-sixteenth inch, and
4. fines fractions, below one-sixteenth inch.

Dust particles released during the screening operation will be picked up by the dust collecting system through line 25. The oversize fraction (1) is returned by line 26 for further granulation in chopper 21. If significant amounts of magnetic materials are entangled or encapsulated in the product in line 26, it is advisable to subject the same to magnetic separation to remove such ferrous materials prior to feeding the non-magnetic residue to the chopper 21. Each of the remaining three fractions (2), (3) and (4) from screening at 24 is separately subjected to density separation in the manner hereinafter described.

While not limited thereto, the use of a three deck screen at 24 is advocated particularly when the chopped product from granulator 21 is of up to about five-sixteenths inch size. For smaller size product a two deck screen will usually be found adequate. In a two deck screen only three different size cuts (excluding dust) are obtained: top or coarse, middle and fines. In this instance the coarse cut is subjected to density separation as well as the middle cut, and is not recycled for further size reduction. The fines cut may be subjected to density separation for purification or collected as a finished product.

Multi-deck screens of progressively reduced mesh size are well known to the art, one type of which is available from Forsberges, Inc. (Thief River Falls, Minn.). These comprise slotted screens arranged one above another and inclined at an acute angle to the horizontal, each screen being associated with eccentric drive mechanism to impart reciprocating or oscillatory motion thereto in the plane of the screen, to assist in moving the charge fed at the elevated end. So called "air liftings" including dust and chaff from the screened product may be removed by aspiration into a dust collection system. The "Screen-Aire" model marketed by Forsbergs, Inc. in equipped for such dust removal. For the present operation, the slots in the uppermost of a two-deck screen may be, for example, .055 × ¼ inch and in the fine screen .020 × ⅛ inch. If a three deck screen is used, the uppermost deck may have slots of about 0.1 × ¼ inch.

As hereinabove indicated, in a preferred practice of the invention, provision is made for protecting the cutters in granulator 21 against damage by large particles in the form of nuggets or the like. The original scrap material having been reduced in size by previous crushing, the last stage of which is indicated at 9, is subjected to separation in an air separator system 10. Conventional air classifiers or separators are well known to the art, suitable forms of which are disclosed in U.S. Pat. Nos. 775,965 and 2,791,331. In the separator, the scrap falls through a generally transverse air stream and is thereby sorted into light and heavy fractions. As illustrated in the accompanying drawing, the heavy fraction from air separator 10 is removed by line 11 and may be recycled to an earlier crushing or grinding stage with or without further intermediate separation or sorting. The dust is picked up by the dust collection system, being fed to duct 23 by connecting line 12, while the light material is conveyed by line 13 enroute to granulation at 21. Although the scrap entering the last stage of crushing at 9 is composed essentially of pieces which are not ordinarily subject to magnetic attraction, as a result of such last crushing stage at 9 and subsequent air separation at 10, magnetically-responsive materials earlier shielded by entanglement and/or encapsulation with non-magnetic covering materials, may now be freed from such association. These released magnetically responsive particles can now be removed from the product stream in line 13 by magnetic separation as indicated at 14, obtaining the non-magnetic product fed by line 20 to granulator 21.

Treatment of the three cuts resulting from size classification at 24 will now be described. The coarsest fractions are each separately treated in similar manner to separate the components thereof according to particle density. Thus, the fraction containing the largest size particles discharged from screening to line 30 is initially charged to a dry specific gravity separator 31 (sometimes referred to as a "gravity separator") in which non-metallic particles and materials lighter (lower in density) than aluminum are removed. This may be accomplished, for example, in a conventional apparatus known in the industry as a "destoner." In this type of device, as designed, the charge of dry granular material flows over an inclined vibrating screen-covered deck. Air is blown or sucked through the deck and through the layer of material. The steady flow of air holds the material in the bed in stratified flotation, with the lighter material being in the upper strata, as it flows or bounces down the inclined vibrating deck. The heavier material travels uphill on the screen to discharge. In operations for which this type of gravity separator was particularly designed, the heavy fraction usually contained stone, glass and the like, hence the designation "destoner." A destoner will effectively separate any two components differing in density by at least 100%. Airborne particles are lifted from the upper strata by the air flow therethrough and are discharged to a dust collection system. At the discharge end for the lighter fraction which is at the low point of the inclined deck, a skimmer knife may be provided, to skim off and divert the top layer (containing relatively lighter materials) from the lower layer (containing relatively heavier materials). For the required density separation of materials in line 30, the operation is conducted in separator 31 to remove fluff and materials lighter than aluminum, discharged through line 32. The heavier materials are sent by line 33 to a second density separator 34. For this initial separation in 31 there may be employed, for example, a Forsberg model H-2 vacuum destoner, or any other similar apparatus designed to separate by density dry granular materials of substantially uniform particle size, into portions of widely differing density.

Separator 34 may be of the same type as that employed at 31, but operated under adjusted conditions, as to inclination of the deck, speed of vibration, throw and air flow intensity, to separate aluminum from the remaining heavier metals. Since the density of aluminum is considerably less than that of the other common metals likely to be encountered in the scrap (differing in density by at least 100%) it is readily recovered from separator 34 in highly pure form, and discharged through line 35. The residual metals from separator 34, some of which are close to one another in density are not readily subject to sharp separation by devices of the "destoner" type.

To effect sharp separation of the remaining metal components from separator 34, these are sent by line 36 to a gravity table type of separator. This type of separator is effective in separating uniformly sized particles having a density difference of 25% or more. The common form of gravity table comprises a meshed deck screen inclined in two directions. A stream of air is passed through the pervious deck stratifying the material thereon by fluidization so that the fluidized lighter materials float in the upper strata, while the heavier materials below are moved further upwardly by the riffled surface of the deck. The charged product is thus divided along the deck into several fractions progressively differing in density. By suitable placement of adjustable dividers, sharp cuts can be effected to provide individual fractions each having its own substantially uniform density, thus obtaining and recovering from the mixed feed three or more products, each of substantially uniform composition. Products of intermediate density between the streams isolated by the dividers, can be separately discharged and recycled to the deck for further separation thereon. Flow of air through the deck may be achieved by blowers below, as in the so-called pressure type gravity tables or induced by suction applied above the deck as in the case of vacuum gravity tables. Examples of both types of such gravity tables are illustrated in the Forsberg Separations Catalogue, describing Models 10 M and 12 M as well as vacuum gravity separators Models 40 V and 50 V. For the present operation the vacuum type is preferred.

The product in line 36 will contain copper and may also contain one or more of the common non-ferrous metals or alloys such as brass, bronze, lead and/or zinc or the like, and perhaps a small quantity of silver. The various non-ferrous metals named thus far rank in ascending order of density:

$$Al < Zn < Cu < Ag < Pb$$

In the gravity table 37 fed by line 36, the zinc component can be readily separated and recovered from the copper and heavier metals. Depending upon the desired purity and the proportional content of other metals, after recovery of the zinc and at least a major portion of the copper at 37, the remaining metals may be recovered as separate divided fractions at 37, or these may be sent to another similar gravity table for separation into the individual metal components. If desired, the individual fractions can be further purified chemically or in other known manner, forming no part of the present invention.

The middle cut from screen deck 24 is discharged by line 40 to the separator 41, which may be similar in design and operation to separator 31. Materials lighter than aluminum are separated out and discharged through line 42, the remaining metal components being sent by line 43 to separator 44, similar in design and operation to separator 34. From separator 44 the aluminum component is recovered in line 45, while the remaining metal components are forwarded by line 46 to one or more gravity tables 47, and subjected to treatment similar to that applied to the mixed metals in separator 37. Some aluminum, not recovered in line 45 may be present in the mixed stream charged to separator 47, in which event it can be readily recovered as a light cut on the gravity table 47.

The fines passing through the lowermost screen at 24 is conveyed by line 50 to a specific gravity separator, which may be similar to the separators 31 and 41 previously described, or a gravity table similar to separators 37 and 47, previously described. As before, the non-metallic materials are removed from the remaining metals and discharged by line 52. The metal product ordinarily remaining will be chiefly copper and may be recovered as such without further separation. If economically warranted, however, this metal residue in line 53 may be subjected to further separation into its individual metal components by means similar to that employed in connection with the mixed metal streams in lines 33 and 43, or in other desired manner.

Each of the separators 31, 34, 37, 41, 44, 47 and 51 may be equipped with means for collecting dust and discharging the same to a common dust collection system, or they may be equipped with individual provisions for dust collection. The non-metallic portions discharged from the metals recovery system, in lines 32, 42 and 52 may be combined and salvaged.

What is claimed:

1. A method of recovering individual components from a previously comminuted scrap from which the original content of ferrous metal components has been at least largely removed, the steps of:

a. subjecting small pieces of such scrap to a chopping operation to reduce the pieces to smaller and more uniformly sized particles;

b. screening said particles to obtain a number of individual streams ranging in particle size from fine to coarse, each said stream being of narrow size distribution range;

c. and subjecting each such stream separately to density separation by pneumatic fluidization to separate each said stream into fractions of different density, at least one of said separated fractions being composed of materials of lower density than aluminum and at least one other of said separated fractions including non-ferrous metals higher in density than aluminum.

2. The method as defined in claim 1 wherein by said density separation a fraction consisting essentially of aluminum is isolated.

3. The method as defined in claim 1 wherein said separated fraction higher in density than aluminum is further subjected to density classification by stratification in air and a cut rich in copper is isolated therefrom.

4. The method as defined in claim 1 wherein prior to being subjected to said chopping operation, the small pieces of comminuted scrap are subjected to air separation for removal of large pieces likely to cause damage to chopping blades.

5. The method as defined in claim 4, wherein after removal of said large pieces by air separation, the remainder of said scrap is subjected to magnetic separation for removal therefrom of ferrous components and the remaining non-magnetic portion only subjected to the defined chopping operation.

6. The method as defined in claim 1 wherein said screening in step (b) thereof is effected on a multi-deck screen and oversize particles retained on the uppermost screen deck are recycled to the chopping operation for further sise reduction.

7. The method as defined in claim 1 wherein said screening in step (b) is effected on a multi-deck screen to provide at least three size classified streams, each of which is subjected to the separation defined in step (c).

8. The method as defined in claim 1 wherein said screening in step (b) is effected on a multi-deck screen to provide four size classified streams, at least three of which streams are subjected separately to the separation defined in step (c).

9. The method as defined in claim 1 wherein said dry density separation in step (c) as applied to at least one of said streams is effected in several distinct stages, at least one of said stages being applied to separate the charge thereto into fractions differing in density by more than 100% and at least one other stage subsequent thereto being applied to separate components of the charge thereto which differ in density by less than 100%.

10. The method as defined in claim 9 wherein said dry density separation as applied to a middle stream fraction from said screening in step (b) is carried out under conditions to effect separation of non-metallic components from aluminum and other ductile metals in said fraction, aluminum is next separated from remaining heavier metals, and the residual heavier metals fraction subjected to a later separation stage to separate metals therein differing in density by less than 100%, copper being recovered in said later stage.

11. The method as defined in claim 1 wherein said dry density separation in step (c) thereof as applied to at least one of said streams is carried out in stages, at least one initial stage being carried out by destoning means and a subsequent stage being carried out on a gravity table.

12. The method of recovering individual components from a previously crushed scrap from whch the original content of ferrous metal components has been at least largely removed, the steps of
  a. subjecting the crushed scrap to air separation to remove heavy oversize pieces;
  b. subjecting the residual lighter fraction from step (a) to magnetic separation to remove ferrous materials freed from prior occlusion in diamagnetic coverings;
  c. granulating the non-magnetic fraction from step (b) by chopping and shearing the same to small size particles;
  d. screening the small size particles from step (c) to obtain at least three size classified individual streams each of which streams is of substantially uniform particle size, while removing dust particles from said streams, thus, providing a stream of fine particles, at least one stream of middlings, and a stream of coarse particles;
  e. subjecting at least the middlings and coarse streams to separation by air flotation to separate each of said streams into fractions of different density range;
  f. subjecting at least one fraction other than the finest fraction, to at least one additional stage of separation to separate the same into metal components differing in density and recovering one of said metal components consisting essentially of aluminum; and
  g. subjecting the non-aluminum portion from step (f) to further separation and recovering therefrom a cut rich in copper.

13. An apparatus for recovering individual components from a ferrous free mixture comprising comminuted scrap, said apparatus comprising in series:
  a. a chopping granulator;
  b. a multi-decked screen for separating the chopped scrap into a plurality of size classified streams, including fine, middlings and coarse particle streams;
  c. means for transporting each of said streams from its discharge point at said multi-decked screen to a separate density separator for such stream;
  d. a density separator for at least one of said streams being a destoner;
  e. means for conveying the heavy fraction recovered from a destoner to a gravity table; and
  f. a gravity table in series with said destoner to effect further separation of components charged thereto by means (e).

14. Apparatus as defined in claim 13 wherein an air separator is provided in advance of said chopping granulator, effective to remove oversize particles from the stream to be charged to said granulator.

* * * * *